April 9, 1929. M. S. RUNSVOLD 1,708,155

AUTOMATIC HEAT REGULATING MEANS

Filed Aug. 30, 1926

INVENTOR.
MARTIN S. RUNSVOLD.
BY A. B. Bowman
ATTORNEY

Patented Apr. 9, 1929.

1,708,155

UNITED STATES PATENT OFFICE.

MARTIN S. RUNSVOLD, OF SAN DIEGO, CALIFORNIA.

AUTOMATIC HEAT-REGULATING MEANS.

Application filed August 30, 1926. Serial No. 132,593.

My invention relates to automatic heat regulating means, particularly adapted for electric connection plugs and also electric heating apparatus.

The objects of my present invention are: first, to provide an automatic heat regulating means in which the controlling thermostat means is provided with an auxiliary spring means whereby the accuracy, elasticity, responsiveness and the life of the thermostat means is materially increased; second, to provide a means of this class in which the force exerted by the spring means on the thermostat means may be varied readily as desired so as to decrease or increase the temperature at which the thermostat means is intended to function; third, to provide an automatic heat regulating means in which auxiliary spring tension is applied at the free end of a plate thermostat member initially under tension by the inherent resiliency of the thermostat member so that the thermostat member will not be distorted until heated to a predetermined temperature, such distortion taking place against the force of the spring means; fourth, to provide an automatic heat regulating means which is encased in a perforated casing adapted to be readily ventilated by the atmosphere so as to quickly cool the connected and associated elements of the thermostat means and electric and heat conducting members so as to decrease to the smallest possible range the temperature at which the contacts, controlled by the thermostat means, are broken and made; fifth, to provide an automatic electric connection plug for electric heating apparatus which will readily respond and be actuated by the heat of the connected heating apparatus; sixth, to provide as a whole a novelly constructed and arranged heat regulating means of this class; and, seventh, to provide means of this class which is particularly simple and economical of construction, durable, highly efficient and which will not readily deteriorate or get out of order.

Figure 1:
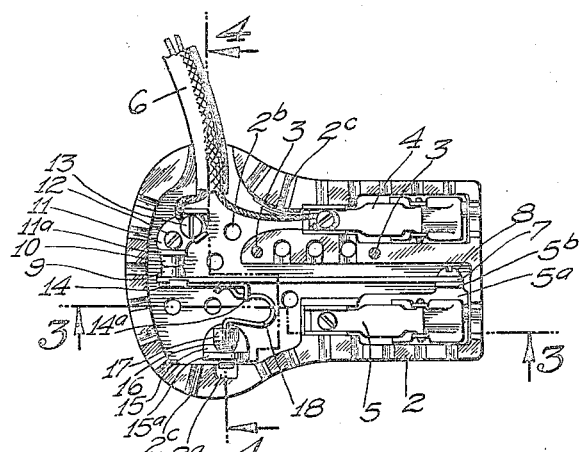
Figure 2:
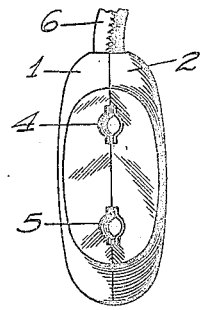
Figure 3:
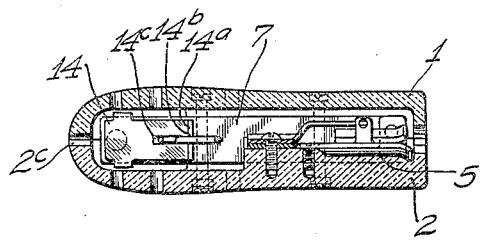
Figure 4:
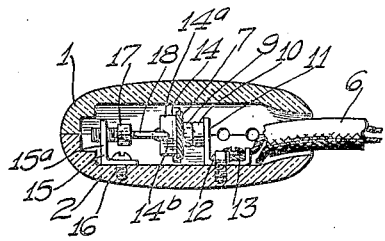

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application, in which:

Figure 1 is a side view of my automatic heat regulating means incorporated in a connection plug such as used for connecting the electric current to electric flat irons, one side of the casing of the plug being removed to facilitate the illustration; Fig. 2 is an end view thereof taken from the terminal end of the plug; Fig. 3 is a longitudinal sectional view thereof taken through 3—3 of Fig. 1, and Fig. 4 is a transverse sectional view thereof taken through 4—4 of Fig. 1.

Like characters of reference refer to similar parts and portions throughout the several views of the drawings.

The casing of my automatic heat regulating means when incorporated in an electric connection plug, as shown in the drawings, may be made of a suitable insulating material as now employed for making similar connection plugs, and consists preferably of a pair of similar casing members 1 and 2, hollow at one side and secured together with their hollow portions adjacent each other by means of suitable bolts 3. At and within the one end of the casing, consisting of the members 1 and 2, are mounted terminal sockets 4 and 5 which may also be of any suitable construction for receiving terminal posts projecting from the heating apparatus to which the plug is adapted to be connected. The terminal socket 4 is connected to the one conductor of the electric cable 6 which extends through one edge and at the opposite end of the casing. The base or stationary contact member 5ª of the terminal socket 5 is provided at one side and near its outer end with a lug 5ᵇ which extends toward and into the casing member 1, it being noted that the contact member 5ª is secured to the casing member 2 in any suitable manner. To the one side of the lug 5ᵇ is secured, by means of a screw 8, the one end of the heat-distortible thermostat member 7. Said thermostat member is a long metallic plate consisting of two plates of metal of different coefficients of expansion suitably secured together. The opposite end of the thermostat member, or plate 7 is free to be moved when the same is subjected to heat.

At the one side of the free end of the thermostat member, is secured a contact member 9 which is preferably made of silver or other suitable material. The contact member 9 normally engages another, or stationary contact member 10 which is mounted at the upper end of a lug 11ª of the contact supporting bracket 11. The bracket, or clip 11 is secured to the bottom or back wall of the casing member 2 by means of a screw 12. This bracket, or clip serves as a binder post to which the other conductor of the cable 6 is connected by means of a screw 13.

To the opposite side of the free end of the thermostat member 7, is secured a clip 14 which is provided at its inner end with an outwardly extending portion 14ª provided with a transverse slot 14ᵇ. Said clip is also provided with a longitudinal slot 14ᶜ between the outwardly extending slotted lug 14ª and the free end of the thermostat member, as shown in Figs. 1 and 3.

To the bottom of the casing member 2, at the opposite side of the thermostat member from the clip 11, is secured, by means of a screw 16, another bracket, or clip 15. This clip 15 is provided at its outer end with an outwardly extending lug 15ª which extends toward and into the casing member 1. In this portion 15ª, is mounted an adjusting screw 17, the end thereof extending toward the thermostat member being provided with a polygonally shaped head for readily adjusting the screw. In the inner end of said screw, or in the head thereof, is a deep circular recess in which is loosely positioned the one end of a wire spring 18 which is bent in the form of a loop, as shown best in Fig. 1. The opposite end of the spring 18 is guided against lateral movement by the slot 14ᵇ and against longitudinal movement relative to the thermostat member 7, by means of the longitudinal slot 14ᶜ in the clip 14. In the casing members 1 and 2 are provided recesses, as indicated by 2ª in Fig. 1, so as to provide considerable adjustment for the adjusting screw 17.

If desired, the adjusting screw, properly insulated, may extend through the side wall of the casing members so that the same may be adjusted without disassembling the plug.

In the side walls of the casing members, are provided a plurality of holes, as indicated by 2ᵇ in Fig. 1, so as to provide for air circulation of the plug and the cooling of the thermostat member, terminal sockets, and the like, after the same are heated, so that the thermostat member will be quickly returned to its normal contacting position, as shown by solid lines in Fig. 1. To provide for still greater circulation of air through the interior of the plug casing, there are provided in the engaging ledges of the plug casing members, opposed inwardly directed grooves, as indicated by 2ᶜ in Fig. 1.

It will be here noted that in heat regulating apparatus in which plate thermostat members are employed, the same lose their elasticity, responsiveness and life prematurely by reason of continued action and unreasonable force on the thermostat member when not subjected to heat, so that substantially the same force applied on the thermostat member at all times until heated to distortion and the auxiliary force to be overcome by the thermostat member when heated is used to initially distort the thermostat member. This construction quickly takes the temper, life, resiliency and responsiveness from the thermostat member. In my construction and arrangement, as shown and described, the thermostat member always returns to its original position irrespective of the temperature or heat desired to be controlled.

Though I have shown and described a particular construction, combination and arrangement of parts and portions, and a particular adaptation of my automatic heat regulating means, I do not wish to be limited to this particular construction, combination and arrangement, not to the particular adaptation, but desire to include in the scope of my invention the construction, combination and arrangement substantially as set forth in the appended claims.

Having thus described my invention, what I claim as new and desire to secure by Letters patent is:

1. In an automatic heat regulating means, a casing having openings at one end and terminals at said end, a heat-distortible thermostat member mounted in said casing and secured at its one end on one of said terminals and free at its opposite end, a contact at the free end of said thermostat member, a stationary contact within said casing contiguous to and adapted to be engaged by the contact at the free end of said thermostat member, and a looped wire spring freely removably mounted at its one end within said casing at the free end of said thermostat member and bearing in a slot in the free end thereof for normally forcing said contacts into engagement with each other.

2. In an automatic heat regulating means, a casing having openings at one end and terminals at said end, a heat-distortible thermostat member mounted in said casing and secured at its one end on one of said terminals and free at its opposite end, a contact at the free end of said thermostat member, a stationary contact within said casing contiguous to and adapted to be engaged by the contact at the free end of said thermostat member, a looped wire spring freely removably mounted at its one end within said casing at the free end of said thermostat member and bearing in a slot in the free end thereof for normally forcing said contacts into engagement with each other, and an adjusting screw means for pivotally supporting and adjusting the first mentioned end of said spring.

3. In an automatic heat regulating means, a casing, a heat-distortible, thermostat member mounted in said casing and secured at its one end only and connected to an electric terminal, a contact at one side of the free end of the thermostat, a stationary contact contiguous to and adapted to be engaged by said first contact, a clip member secured to the other side of the free end of the thermostat, the inner portion of said clip member being bent outwardly, and provided with a notch therein, said clip being also provided with an elongated slot extending longitudinally therewith, a wire spring member supported at its one end in said slot and notch and an adjusting screw having a recess in its end for supporting the other end of said wire spring member and adapted to adjust the pressure thereof against the thermostat member.

In testimony whereof, I have hereunto set my hand at San Diego, California this 13th day of August, 1926.

MARTIN S. RUNSVOLD.